United States Patent Office 2,741,645
Patented Apr. 10, 1956

2,741,645

PROCESS FOR TREATING MONOCYCLIC TERPENE HYDROCARBONS AND FOR PREPARING NICKEL CATALYST THEREFOR

Joseph P. Bain, Robert E. Fuguitt, and Wilbur Y. Gary, Jacksonville, Fla., assignors to The Glidden Company, Cleveland, Ohio, a corporation of Ohio No Drawing. Application June 6, 1952,
Serial No. 292,204

5 Claims. (Cl. 260—666)

This invention relates to a process for treating monocyclic terpene hydrocarbons with an active nickel catalyst capable of effecting dehydrogenation and disproportionation reactions, and conversion of the hydrocarbons into a mixture of cymene and menthane.

It is already known that a mixed nickel-copper catalyst can effect the conversion of monocyclic terpene hydrocarbons into cymene and menthane (U. S. Patent No. 2,211,432), but we have found that it is unnecessary to use active copper along with the active nickel. Our active nickel catalyst may be formed by the in-situ reduction of nickel formate accompanied with an induction period. After the active nickel catalyst has been formed, it may be used in subsequent batches without further inductive treatment.

Accordingly, it is an object of this invention to provide a novel process for converting monocyclic terpene hydrocarbons into cymene in good yields by the sole use of an active nickel catalyst.

It is a further object to provide a process for treating nickel formate so as to prepare an active nickel catalyst capable of effecting the conversion of monocyclic terpene hydrocarbons into cymene.

These and other objects will be apparent from the following description of the invention.

We have found that nickel formate yields an active catalyst capable of converting monocyclic terpene hydrocarbons into cymene in good yields when it is subjected to an inductive treatment in which it is heated and agitated with a quantity of the monocyclic terpene hydrocarbons under refluxing conditions. The induction period usually varies from about 4 hours to 8 hours, although in certain cases, as with the higher boiling monocyclics gamma terpinene and terpinolene, the induction period may be as short as one hour. During this period there is little reaction as measured by reduction of bromine value, agitation is necessary to keep the nickel formate in suspension, and some water is liberated and is removed by a decanter. The water amounts to 20–30% by weight of the catalyst when the hydrocarbons undergoing treatment were originally dry. After the catalyst has become activated, however, disproportionation and dehydrogenation reactions become rapid and the bromine value drops to zero within a few hours. The liberation of hydrogen during this period is generally sufficient to keep the catalyst suspended without need of mechanical agitation. After the reaction has been finished, the mass may be cooled, during which time the catalyst settles out, and then the liquids may be decanted or otherwise separated from the catalyst. The catalyst may then be added to a new batch of monocyclic terpene hydrocarbons and refluxed therewith. Little or no induction period is involved with this second batch of material and only a trace of water is liberated. The disproportionation and dehydrogenation reactions begin immediately and the bromine value drops to zero within a few hours. In similar manner the active catalyst may be employed sequentially with several further batches of material before its catalytic qualities become exhausted.

The liquid products resulting from treatment of monocyclic terpene hydrocarbons with the catalyst in the manner just described are composed mainly of cymene and menthane in proportions of about 2 to 12 parts cymene per part of menthane. Usually the cymene content of the treated mass will amount to about 70–85% of the total, although it varies with the condition of the catalyst and with the particular terpene or mixture of terpenes being treated. The components of the treated mass may be separated and recovered effectively by fractional distillation in conventional manners.

The monocyclic terpene hydrocarbons which are suitable for use as starting materials for the production of cymene includes all of those hydrocarbons having the empirical formula $C_{10}H_{16}$ and belonging to the paramenthane series, as well as mixtures of such hydrocarbons, particularly such commercial mixtures known in the trade as "dipentene," "dytin," "Solvenol" and the like, which are composed of dipentene, d- and l-limonene, terpinenes, phellandrenes, terpinolene and other conjugated menthadienes, such as menthadiene 2,4(8). Such materials boil between about 170° and 190° C. at atmospheric pressure. Amounts of cymene up to about 10% by weight of the total monocyclic terpene hydrocarbons may also be present in the starting material. We prefer to use freshly distilled monocyclics since the monocyclics tend to oxidize rapidly and then react sluggishly if at all.

The catalyst concentration does not appear to be particularly critical, quantities of nickel formate as low as 1% being effective, and amounts as high as 5% exhibiting no deterrent influences on the reaction. In general we prefer to use 3–5% of catalyst.

The catalyst should be in a powdery form and should be maintained in suspension in the reaction mass, either by the use of suitable mechanical agitation, or as a result of the agitation produced by the active boiling of the charge during certain phases of the treatment. During the initial treatment of the nickel formate, for its activation, water is formed in appreciable quantities, and such water should be separated from the mass as by means of a dephlegmator. When dry monocyclic terpenes are employed, the water so liberated amounts to 20–30% by weight of the nickel formate. In subsequent runs using pre-activated catalyst, only such traces of water as may be initially present in the monocyclic terpenes are collected and separated by the dephlegmator.

As indicated above, we especially prefer to use nickel formate in preparing the active catalyst. Material of commercial purity has been found to be quite satisfactory, although variations in activity have been noticed when the products of different suppliers are compared. This may be due to the presence of inhibitors of presently unknown nature, either in the nickel formate or in the terpenes being treated.

We have found that nickel catalysts activated in other ways than described herein, such as Raney nickel and commercial hydrogenation nickel catalysts, are either partly or wholly ineffective in reducing the unsaturation of monocyclic terpenes or mixtures thereof.

It will be understood that when preparing the active nickel catalyst in the first instance, any desired amount of nickel formate in excess of the minimum needed to treat the batch may be incorporated in the mass of terpene hydrocarbons and therein activated. We have successfully used as much as 1 part of nickel formate by weight to 3 parts by weight of dipentene. After the catalyst has been thus activated, a portion thereof may be used in effective amounts in treating subsequent batches of material until exhausted. A further portion of the initial batch of activated catalyst may then be employed in additional subsequent batches of the terpene hydrocarbons. In other words, the whole batch of catalyst which is initially activated need not be used in each of the subsequent batches of terpene hydrocarbons. Indeed, it is desirable to limit the amount of activated catalyst in subsequent batches to about 5% since the catalytic reaction is exothermic and may be difficult to control if amounts larger than about 5% are employed. Large amounts of nickel formate may be activated safely in a single induction treatment since there the exothermicity is more gradual.

It will also be understood that in activating a given batch of catalyst, it is not necessary to carry the treatment on until the bromine value of the entire mass of liquid terpenes has been reduced substantially to zero. It is only necessary to heat the nickel formate with the liquid terpene hydrocarbons until the bromine value has been reduced more than would be the bromine value of the mass of the same terpene hydrocarbons when similarly heated in the absence of nickel formate. Of course, the activating treatment may also be carried beyond this stage as far as may be desired to ensure complete activation of the catalyst, and as explained above may be continued until the bromine value of the mass has been reduced substantially to zero.

The following examples illustrate particular embodiments of the principles of the invention:

*Example I*

Three hundred ninety-one pounds of a mixture of terpenes, chiefly monocyclics, and composed of alpha terpinene; gamma terpinene; terpinolene; dipentene; menthadiene 2,4(8) and traces of related monocyclics together with a small quantity, about 5%, camphene and about 5% cymene was treated with 5% by weight of commercial nickel formate and heated at reflux. A sample withdrawn from the boiling mixture at the end of four hours showed on bromine titration that the reaction had begun since the bromine value had decreased. Between 10% and 50% conversion, as measured by reduction of the bromine value, hydrogen was liberated at the rate of approximately five to six cubic feet per hour. Hydrogen evolution gradually increased to a maximum rate of 100 cubic feet per hour at 82% conversion then gradually decreased to zero at the end of the run. A total of 520 cubic feet of hydrogen was evolved indicating the direct dehydrogenation of an appreciable portion of the charge. Sixteen hours were required to reduce the unsaturation to about 0.5% of the original value.

The charge was cooled and settled and the reaction product was decanted from the catalyst. Three hundred eighty-four pounds of fresh terpene monocyclics was added to the vessel containing the settled catalyst. On heating to reflux, the reaction became so vigorous that in ten minutes heating was discontinued and some cooling of the charge by means of cooling coils was necessary to moderate the reaction. The point of maximum hydrogen evolution could not be recorded but was well in excess of 150 cubic feet per hour. After 65% conversion, the rate of hydrogen evolution decreased gradually to zero at complete conversion as measured by the absence of unsaturation. The reaction was complete in six hours.

Again the charge was cooled, settled and decanted from the catalyst. Three hundred fifty-eight pounds of fresh terpene monocyclics was added and the reaction proceeded smoothly with maximum hydrogen evolution of three hundred sixty cubic feet per hour. When the charge showed zero bromine value, it was cooled, settled and decanted away from the settled catalyst as before. Ten hours were required to complete the reaction.

Three hundred sixty pounds of fresh "dipentene" was added to the catalyst in the reaction vessel but could not be forced to react completely as it showed only 67% reduction in bromine value at the end of nine hours refluxing.

This charge was separated as before and the partly-converted material held for reprocessing with fresh catalyst.

Material possessing substantially zero bromine value in the above series of experiments was combined for fractionation to menthane, menthane-cymene intermediates and pure cymene.

*Example II*

Samples of pure monocyclic terpenes were treated with 4% by weight nickel formate at the reflux temperature until the bromine value had dropped substantially to zero. Analyses of the crude reaction mixtures were made by infra-red spectrophotometry. During the induction period, the greenish nickel formate remains unchanged in the boiling mixture; then as the reaction begins, it rapidly turns black as metallic nickel is formed.

| Pure Terpene | Initial Reflux Temp., °C. | Final Reflux Temp., °C. | Percent Cymene in crude reaction product | Total Reaction Time, Hours |
|---|---|---|---|---|
| d-Limonene | 179 | 176 | 85 | 9 |
| Alpha Terpinene | 175 | 176 | 93 | 13 |
| Terpinolene | 189 | 176 | 90 | 7½ |

Analytical values for unsaturation as given hereinabove were obtained by determination of bromine value by direct titration of a sample with dilute bromine in acetic acid. Analyses for cymene in reaction products were made employing infra-red spectrophotometry, efficient fractionation, refractive index determinations or combinations of these methods where applicable.

Having now described our invention, what we claim is:

1. The process of treating monocyclic terpene hydrocarbons, which comprises: heating said hydrocarbons to reaction temperatures in the liquid phase in the presence of an effective amount of an active nickel catalyst until the bromine value of the mass has been reduced substantially to zero, said nickel catalyst being substantially free of copper and having been prepared by subjecting nickel formate to prolonged contact with monocyclic terpene hydrocarbons under refluxing conditions until activated as shown by its change in color from its original greenish color to black.

2. The process as claimed in claim 1 wherein the amount of said active catalyst is between about 1.0% and 5% by weight of the terpene hydrocarbons being treated.

3. The process as claimed in claim 1 which includes the further steps of separating the catalyst from the reaction mass, and fractionally distilling the liquid components of the treated mass to recover cymene and menthane therefrom.

4. The process as claimed in claim 1 which includes the further step of separating the catalyst from the reaction mass and subsequently using it to treat additional batches of monocyclic terpene hydrocarbons by the process of claim 1 until the activity of the catalyst has been exhausted.

5. The process of preparing an active nickel catalyst which is capable of dehydrogenating and disproportionating monocyclic terpene hydrocarbons substantially completely to cymene and menthanes when heated with said hydrocarbons in liquid phase in the absence of copper, said process comprising the step of subjecting nickel formate to prolonged contact with monocyclic terpene hydrocarbons under reflux conditions until the bromine value of said hydrocarbons has been reduced substantially more than would be the bromine value of said terpene hydrocarbons when similarly heated in the absence of nickel formate, and until the color of the catalyst has changed to black from its original greenish color.

References Cited in the file of this patent

UNITED STATES PATENTS

| | | |
|---|---|---|
| 2,052,917 | Bergstrom | Sept. 1, 1936 |
| 2,211,432 | Palmer et al. | Aug. 13, 1940 |

FOREIGN PATENTS

| | | |
|---|---|---|
| 92,484 | Sweden | June 8, 1938 |

OTHER REFERENCES

Treibe Berichte, vol. 68B, pages 1041–1049 (1935). Abstracted in Chem. Abstracts, vol. 29, page 5435 (1935).